J. W. MAJEK.
BREAKING PLOW.
APPLICATION FILED SEPT. 30, 1907.
962,646.
Patented June 28, 1910.
2 SHEETS—SHEET 1.
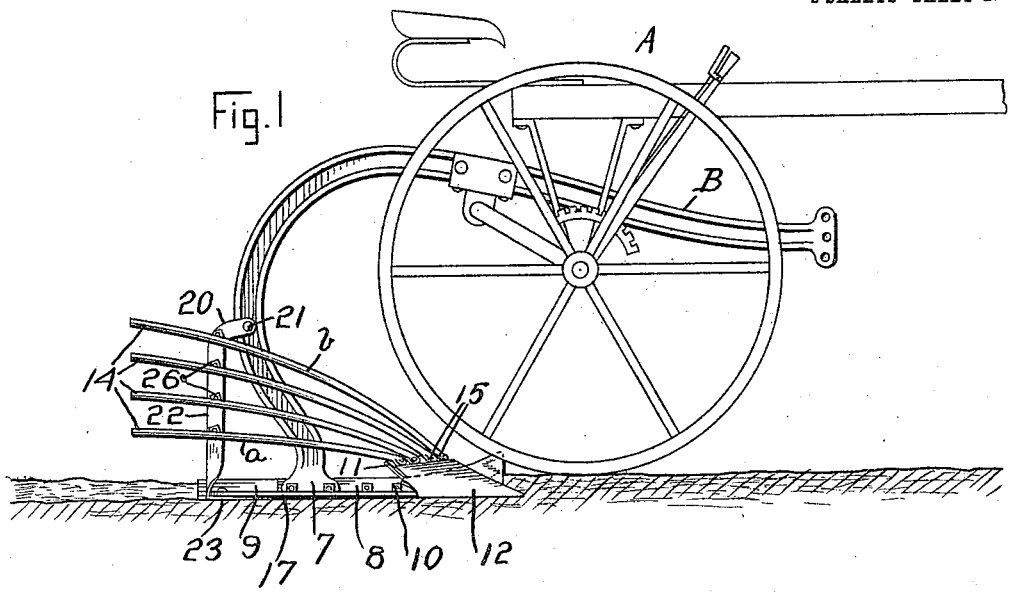
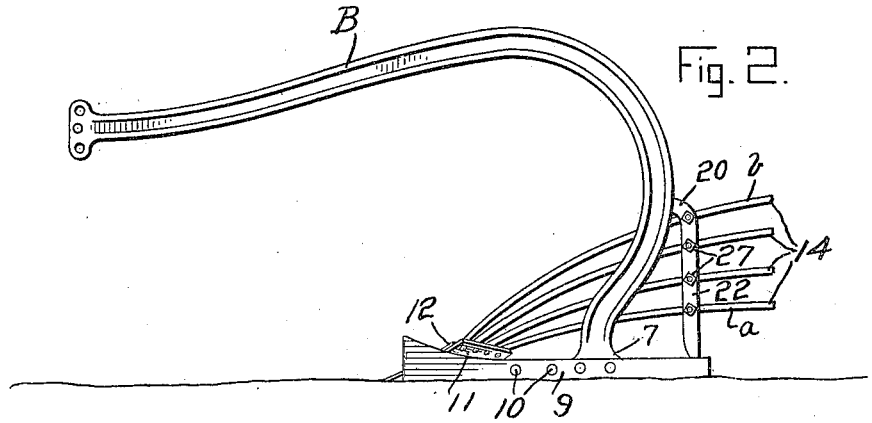
Witnesses
C. K. Reichenbach
F. G. Smith
Inventor
J. W. Majek
By Chandler Chandler
Attorneys J. W. MAJEK.
BREAKING PLOW.
APPLICATION FILED SEPT. 30, 1907.
962,646.
Patented June 28, 1910.
2 SHEETS—SHEET 2.
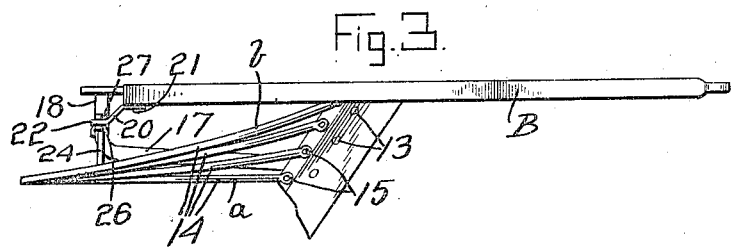
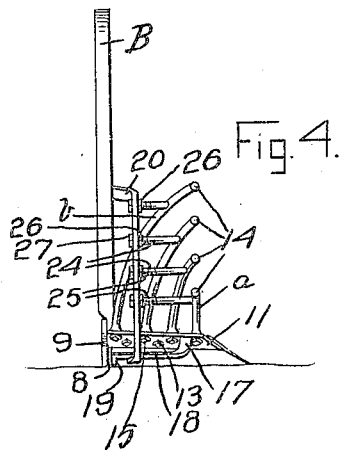
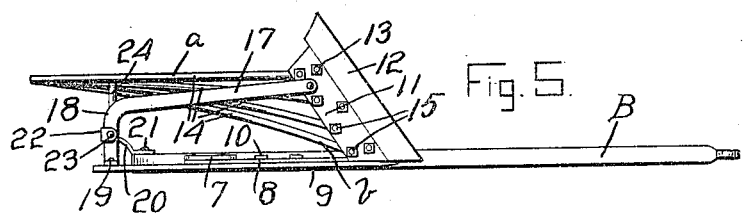

UNITED STATES PATENT OFFICE.

JOHN W. MAJEK, OF ATWOOD, KANSAS.

BREAKING-PLOW.

962,646.  Specification of Letters Patent.  Patented June 28, 1910.

Application filed September 30, 1907. Serial No. 395,231.

*To all whom it may concern:*

Be it known that I, JOHN W. MAJEK, a citizen of the United States, residing at Atwood, in the county of Rawlins, State of Kansas, have invented certain new and useful Improvements in Breaking-Plows; and I do hereby declare the following to be a full, clear, and exact description of the invention, such as will enable others skilled in the art to which it appertains to make and use the same.

This invention relates to plows and more particularly to breaking plows.

The primary object of the invention is to provide a plow of this class which in operation will turn the furrows completely over as they are made and prevent them falling back as happens when plowing hilly land or breaking prairie land where the sod is so stiff and hard that it will not turn over.

The plow is designed to be attached to an ordinary frame in place of the usual plows supported thereby and in view of the fact that the plow is to be sold separately from the plow frame, I have endeavored to simplify as far as possible, the construction of the plow and at the same time render it more efficient, thus bringing the purchase price within reach of any one.

In the accompanying drawings, Figure 1 is a side elevation of the plow showing the same supported from an ordinary frame, Fig. 2 is a similar view, but of the opposite side of the plow, the plow being removed from the frame, Fig. 3 is a top plan view of the plow, Fig. 4 is a rear elevation thereof, and, Fig. 5 is a bottom plan view.

In the drawings there is shown a plow frame of the usual construction which is indicated by the reference character A and a plow beam B which is connected with the plow raising and lowering mechanism of the frame as shown in Fig. 1 of the drawings. This beam is formed at its lower end with a foot 7 to which is bolted a plate 8 which affords a means for attaching a land side 9 at the lower end of the plow beam, this land side being secured to the plate 8 by means of bolts 10 which are passed therethrough and through the said plate. The plate 8 is angular in cross section, enabling the foot of the plow to rest on one flange or angle, and the other to bear against its side to which the land-side is secured by the bolts 10, as well as to the plate 8. (See Fig. 2.) Formed integral with the upper edge of the plate 8 at the forward edge thereof is a plow share attaching plate 11 this plate being extended laterally from the plate 8 and in a direction from the land side 9. The plow share mentioned above is indicated by the numeral 12 and is secured by means of bolts 13 to the said attaching plate 11 and the forward edge of this plow share is sharpened, is extended forwardly of the forward cutting edge of the land side 9, and is also extended obliquely, that end of the share which is more removed from the land side 9 being located rearwardly of the end located next to the land side.

The mold board of the plow is made up of a plurality of rods which are indicated by the numeral 14 and are secured at their forward ends by means of bolts 15 to the plow share attaching plate 11 adjacent the rear edge thereof and these rods are curved rearwardly and outwardly with their rear ends terminating in a common vertical plane, the lowermost or outermost rod also indicated by the reference character $a$ being curved to a less degree than the innermost or uppermost rod also indicated by the character $b$.

Secured at its forward end by means of a bolt 16 to the plow share attaching plate 11 is a bar 17 which is extended rearwardly from the said plate and has its rear end portion curved laterally in the direction of the land side attaching plate 8 as indicated by the numeral 18, the extreme end of this portion 18 being secured as at 19 to the said plate 8 adjacent the rear end thereof. A bar 20 is secured at its upper forward end by means of a bolt 21 to the plow beam at a point above the foot thereof and is extended rearwardly a short distance and then offset and extended downwardly as at 22. The lower end portion of this bar is bent forwardly as at 23 and is bolted at its extreme end to the bar 17 at the bend therein. In order to brace the rods 14 comprising the mold board of the plow each of these rods is provided with a laterally extending stem 24 which is threaded as at 25 and is engaged through openings formed in the vertically extending portion 22 of the bar 20 and engaged upon the threaded portion of each of these stems 24 is a nut 26 which bears against one side of the said portion 22 and a nut 27 which bears against the other side thereof.

From the foregoing it will be understood that the bar 17 serves to brace the outer portion of the plow share and its attaching plate 11 with the plate 8 to which the land side is attached and that the bar 20 not only serves as a brace for the rods 14 but also serves as a brace for the bar 17.

By the construction set up in the drawings and in the foregoing description of the specification it will be seen that a very substantial plow is provided and one which is not complicated nor expensive to manufacture.

What is claimed, is—

In a plow, a beam, a foot thereon, a share and mold board attaching plate at the forward end of said foot, a brace for said plate, said brace being bent substantially of L-shape in plan and having its forward end attached to the share and mold board attaching plate and its rearward end to said foot, and a combined rear mold board support and brace comprising a bar having its upper end connected to the beam and its lower end to the first named brace adjacent the bend thereof.

In testimony whereof, I affix my signature, in presence of two witnesses.

JOHN W. MAJEK.

Witnesses:
FRANK E. ROBINSON,
WM. CORRELL.